United States Patent
Akkarakaran et al.

(10) Patent No.: US 11,071,076 B2
(45) Date of Patent: Jul. 20, 2021

(54) SYNCHRONIZATION SIGNAL BLOCK INDEXING

(71) Applicant: QUALCOMM Incorporated, San Diego, CA (US)

(72) Inventors: Sony Akkarakaran, Poway, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 33 days.

(21) Appl. No.: 16/393,558

(22) Filed: Apr. 24, 2019

(65) Prior Publication Data

US 2019/0335406 A1 Oct. 31, 2019

Related U.S. Application Data

(60) Provisional application No. 62/663,768, filed on Apr. 27, 2018.

(51) Int. Cl.
| | |
|---|---|
| *H04L 12/28* | (2006.01) |
| *H04W 56/00* | (2009.01) |
| *H04W 74/08* | (2009.01) |
| *H04W 74/02* | (2009.01) |
| *H04W 24/08* | (2009.01) |
| *H04W 76/27* | (2018.01) |
| *H04W 24/10* | (2009.01) |

(52) U.S. Cl.
CPC ......... *H04W 56/001* (2013.01); *H04W 24/08* (2013.01); *H04W 24/10* (2013.01); *H04W 74/02* (2013.01); *H04W 74/0833* (2013.01); *H04W 76/27* (2018.02)

(58) Field of Classification Search
CPC ...................................................... H04L 12/28
USPC ........................................................ 370/329
See application file for complete search history.

(56) References Cited

U.S. PATENT DOCUMENTS

2019/0155524 A1* 5/2019 Frank ..................... G06F 11/00
2020/0067640 A1* 2/2020 Hui ....................... H04L 1/0061

OTHER PUBLICATIONS

International Search Report and Written Opinion—PCT/US2019/029401—ISA/EPO—dated Jul. 3, 2019.

(Continued)

*Primary Examiner* — Dang T Ton
(74) *Attorney, Agent, or Firm* — Qualcomm Incorporated

(57) ABSTRACT

A base station and a user equipment (UE) may communicate using a compressed synchronization signal blocks (SSB) index for over the air communications. Each of the base station and UE may determine a number of relevant SSBs with respect to a communication based at least on a maximum number of SSBs for a frequency band of the communication. Each of the base station and UE may determine a compressed index length based on the number of relevant SSBs. Each of the base station and UE may transmit or receive the communication including a compressed index value of the compressed index length. Each of the base station and UE may map between the compressed index value and an SSB index value based on the compressed index length and the number of relevant SSBs.

41 Claims, 6 Drawing Sheets

(56) References Cited

OTHER PUBLICATIONS

LG Electronics: "Remaining Issues on SS Block Design and Indication Method," 3GPP Draft; R1-1713121 Remaining Issues on SS Block Design and Indication Method, 3rd Generation Partnership Project (3GPP), Mobile Competence Centre; 650, Route Des Lucioles; F-06921 Sophia-Antipolis, vol. RAN WG1, No. Prague, Czech Republic; Aug. 21, 2017-Aug. 25, 2017, Aug. 20, 2017, XP051315930, 8 Pages, Retrieved from the Internet: URL: http://www.3gpp.org/ftp/Meetings_3GPP_SYNC/RAN1/Docs/ [retrieved on Aug. 25, 2017].

ZTE et al: "Remaining Details of Synchronization Signal Design," 3GPP Draft; R1-1717030, 3rd Generation Partnership Project (3GPP), Mobile Competence Centre; 650, Route Des Lucioles; F-06921 Sophia-Antipolis Cedex, France, vol. RAN WG1, No. Prague, Czech Republic; Oct. 9, 2017-Oct. 13, 2017, Oct. 8, 2017, XP051340222, 6 pages, Retrieved from the Internet: URL: http://www.3gpp.org/ftp/Meetings_3GPP_SYNC/RAN1/Docs/ [retrieved on Oct. 8, 2017] p. 2, paragraph 3—p. 4 p. 5, paragraph 5.

\* cited by examiner

_US 11,071,076 B2_

SYNCHRONIZATION SIGNAL BLOCK INDEXING

CLAIM OF PRIORITY UNDER 35 U.S.C. § 119

This application claims priority to U.S. Provisional Application No. 62/663,768 titled "SYNCHRONIZATION SIGNAL BLOCK INDEXING," filed Apr. 27, 2018, which is assigned to the assignee hereof, and incorporated herein by reference in its entirety.

BACKGROUND

Aspects of the present disclosure relate generally to wireless communication networks, and more particularly, to communications between a user equipment (UE) and one or more base stations.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, current synchronization signal identification solutions may not provide a desired level of speed or customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method of wireless communications. The method may include determining a number of relevant synchronization signal blocks (SSBs) with respect to a communication based on one or more of: a maximum number of SSBs for a frequency band of the communication, a state of a user equipment (UE), or whether the SSBs are for a serving cell or neighbor cell. The method may include determining a compressed index length based on the number of relevant SSBs. The method may include transmitting or receiving the communication including a compressed index value of the compressed index length. The method may include mapping between the compressed index value and an SSB index value based on the compressed index length and the number of relevant SSBs.

In another aspect, the present disclosure includes an apparatus for wireless communication. The apparatus may include a memory, a wireless transceiver, and a processor communicatively coupled with the memory and the wireless transceiver. The processor may be configured to determine a number of relevant SSBs with respect to a communication based on one or more of: a maximum number of SSBs for a frequency band of the communication, a state of a user equipment (UE), or whether the SSBs are for a serving cell or neighbor cell. The processor may be configured to determine a compressed index length based on the number of relevant SSBs. The processor may be configured to transmit or receive the communication including a compressed index value of the compressed index length. The processor may be configured to map between the compressed index value and an SSB index value based on the compressed index length and the number of relevant SSBs.

In another aspect, the present disclosure includes an apparatus for wireless communication. The apparatus may include means for determining a number of relevant SSBs with respect to a communication based on one or more of: a maximum number of SSBs for a frequency band of the communication, a state of a user equipment (UE), or whether the SSBs are for a serving cell or neighbor cell. The apparatus may include means for determining a compressed index length based on the number of relevant SSBs. The apparatus may include means for transmitting or receiving the communication including a compressed index value of the compressed index length. The apparatus may include means for mapping between the compressed index value and an SSB index value based on the compressed index length and the number of relevant SSBs.

In another aspect, the disclosure provides a computer-readable medium storing computer-executable code. The computer-readable medium may include code to determine a number of relevant SSBs with respect to a communication based on one or more of: a maximum number of SSBs for a frequency band of the communication, a state of a user equipment (UE), or whether the SSBs are for a serving cell or neighbor cell. The computer-readable medium may include code to determine a compressed index length based on the number of relevant SSBs. The computer-readable medium may include code to transmit or receive the communication including a compressed index value of the compressed index length. The computer-readable medium may include code to map between the compressed index value and an SSB index value based on the compressed index length and the number of relevant SSBs. The computer-readable medium may be a non-transitory computer-readable medium.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
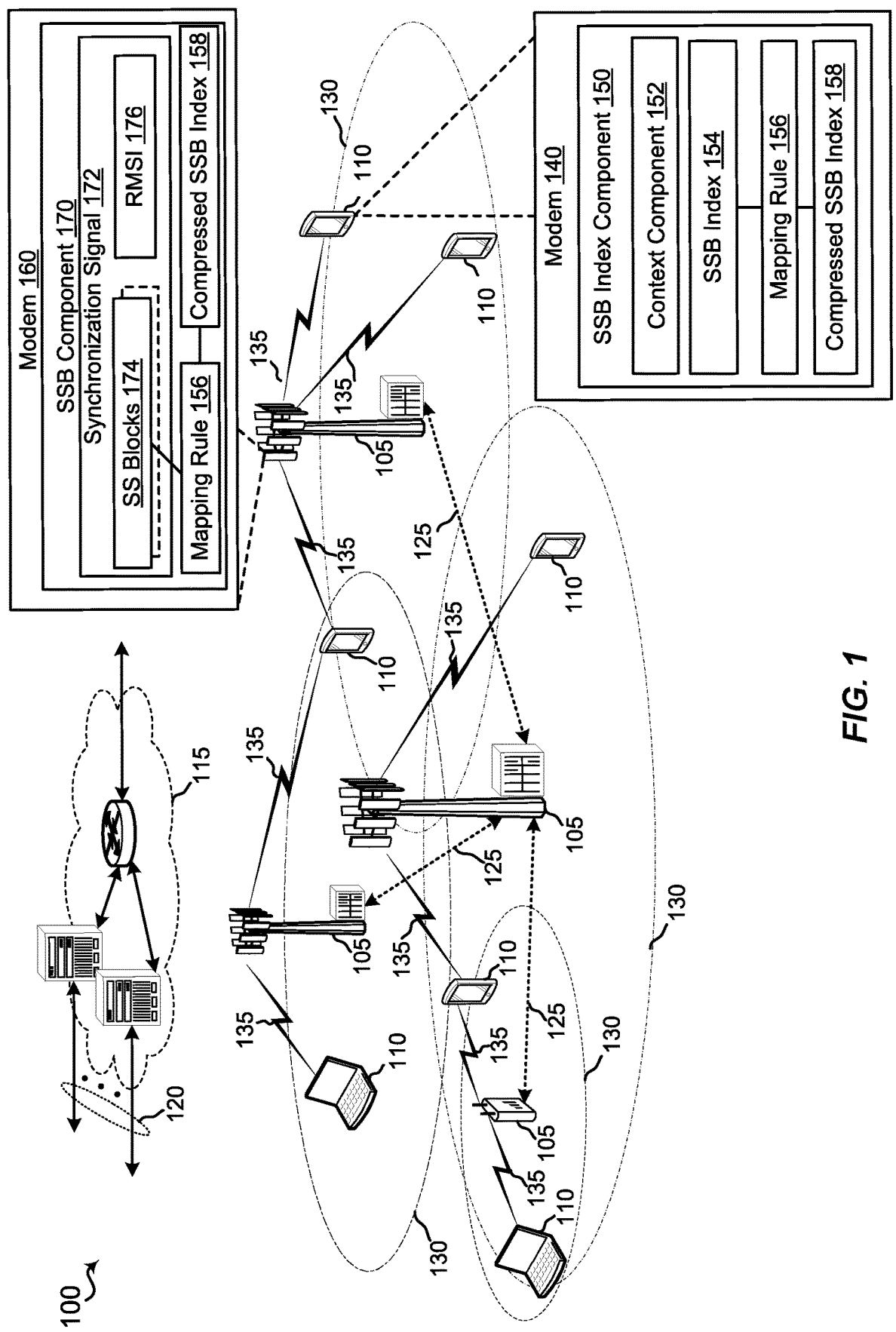
FIG. 1 is a schematic diagram of an example wireless communication network including at least one UE having a SSB index component configured according to this disclosure to transmit or receive a communication including a compressed RACH index.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium and executable by a hardware processor, and may be divided into other components.

The present disclosure generally relates to synchronization signal blocks (SSBs) transmitted in new radio (NR) procedures that may be executed by a UE and a base station, resulting in communications that may be more efficient than conventional SSB procedures. For example, NR communications may include an SSB-Index information element (IE) that identifies an SS-Block within an SS-Burst. The SSB-Index IE may be defined as an integer between 0 and 63 (representing a maximum of 64 SSBs), which requires a minimum of six bits to transmit. In some cases, a number of relevant SSBs is significantly less than the maximum number of SSBs, but the same SSB-Index IE may be used, resulting in a fixed length to indicate the SSB index.

In an aspect, the present disclosure provides for a compressed SSB index that may have an index length less than the defined SSB-Index IE. The compressed SSB index length may be based on a number of relevant SSBs and determined by both a UE and a base station either separately, or based on communicated rules. The compressed SSB index length may be dynamic and may adjust to a current configuration, communication context, or UE state. As such, in some cases, the compressed SSB index may reduce the number of bits transmitted over the air for communicating information regarding SSBs. That is, the compressed SSB index may reduce overhead associated with SSBs and/or improve reliability of communications. For example, a control channel carrying measurements of SSBs may utilize fewer resources or utilize a lower coding rate.

Additional features of the present aspects are described in more detail below with respect to FIGS. 1-6.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an NR/5G system for purposes of example, and NR/5G terminology is used in much of the description below, although the techniques are applicable beyond NR/5G applications (e.g., to legacy networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 with a modem 140 having an SSB index component 150 that manages communication of new radio (NR; also referred to as 5G) SSB indices, in communication with base station 105, resulting in communication of a compressed SSB index 158. For example, SSB index component 150 may include a context component 152 configured to determine a number of relevant SSBs based on a context of the UE 110 and/or the base station 105. In an aspect, the SSB index component 150 may determine an SSB index 154 of an SSB to be identified in a communication. The SSB index component 150 may map the selected SSB index to the compressed SSB index 158 using a mapping rule 156 selected based on the context and/or a number of relevant SSBs. For example, the context may refer to a connection status or configuration of the UE 110. The number of relevant SSBs may be a value signaled by the base station 105 or determined based on the context. Further, wireless communication network 100 includes at least one base station 105 with a modem 160 having a SSB component 170 that performs complementary operations with respect to the SSB index component 150, in communication with UE 110. The SSB component 170, independently or in combination with SSB index component 150 of UE 110, may transmit a synchronization signal 172 including a number of the SS-blocks 174 (each of which may correspond to an SSB index 154). For example, the synchronization signal 172 may be based, at least in part, on feedback from the SSB index component 150. The SSB component 170 may transmit a remaining minimum system information (RMSI), which may be carried in a SIB1 message, 176, which may be used by the SSB index component 150 of the UE 110 to obtain information about the SS-blocks 174, such as a number of transmitted SSBs. The SSB component 170 may also determine a mapping rule 156, which in turn may be used to determine a compressed SSB index 158. Conversely, when either the SSB component 170 or the SSB index component 150 receives a communication including a compressed SSB index 158, the SSB component 170 or the SSB index component 150 may map the compressed SSB index 158 to an SSB index 154 and/or an SS-block 174. Thus, according to the present disclosure, compressed SSB index 158 may be included in over the air communications in a manner that improves an efficiency of UE 110 and base station 105 in identifying SS-blocks 174.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The core network 115 may include one or both of an Evolved Packet Core (EPC) and a 5G Core (5GC). The base stations 105 may interface with the core network 115 through backhaul links 120 (e.g., S1, etc.), which may be wired or wireless communication links. The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNodeB (gNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term eNB may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the radio resource control (RRC) protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

The UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communication network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
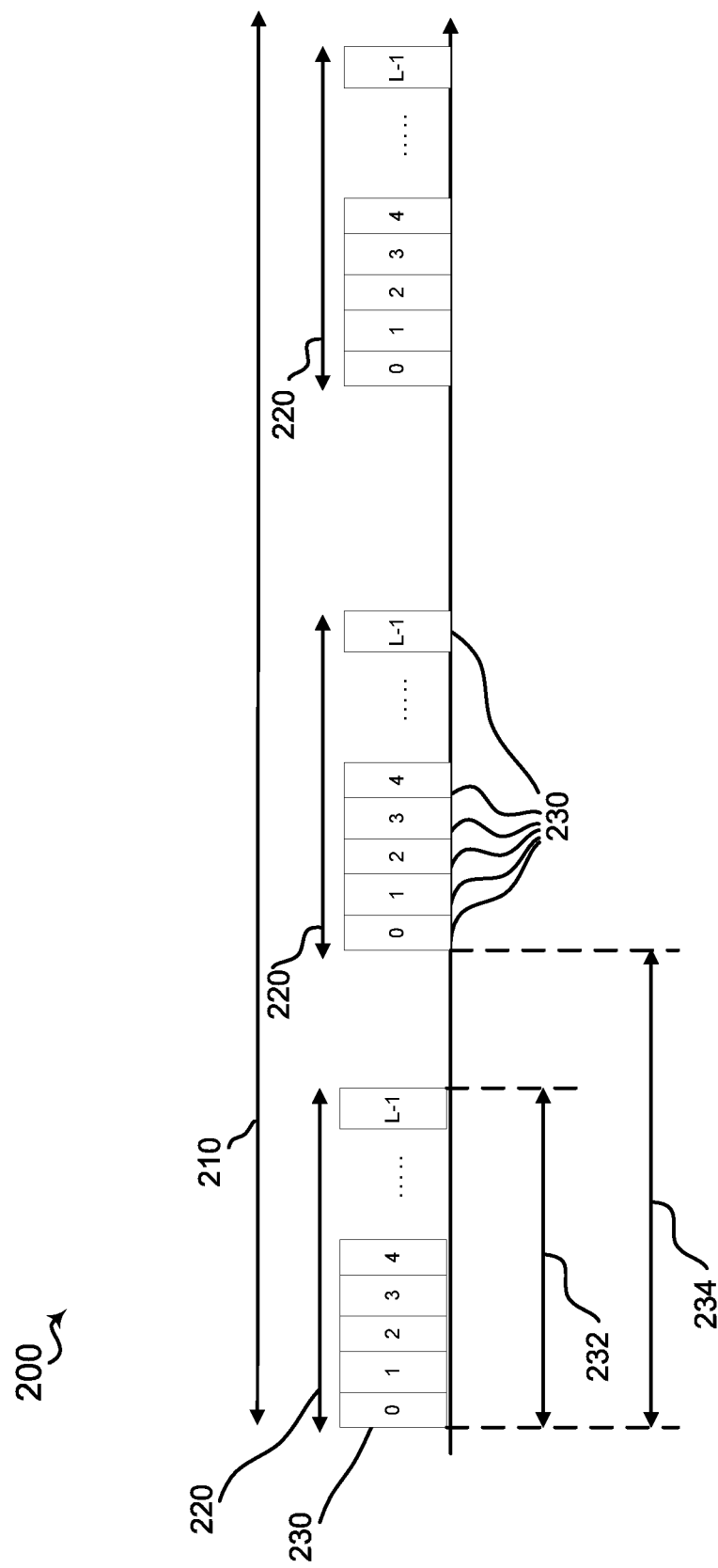
FIG. 2 is a conceptual diagram of an example synchronization signal including multiple synchronization signal blocks.

Referring to FIG. 2, a diagram 200 includes a synchronization signal 210 (or synchronization signal burst series) that a base station 105 may transmit for UEs to perform cell detection and measurement. For certain frequency bands (e.g., >6 GHz or mmWave), the synchronization signal 210 may be transmitted in the form of a sweeping beam. The sweeping beam may include a periodic synchronization signal bursts 220 of synchronization signal blocks (SS-blocks) 230, which may correspond to SS-block 174. For example, the SS-burst 220 may include L SS-blocks 230. In an example, the number of SS-blocks L may be 64, for example, in spectrum >6 GHz. Fewer SS-blocks may be supported in lower frequency spectrum. For example, a maximum of L=4 SS-blocks may be used for frequency bands less than or equal to 3 GHz and a maximum of L=8 SS-blocks may be used for frequency bands between 3 and 6 GHz. The SS-burst 220 may have a duration 232 and a periodicity 234. The SS-blocks 230 may include an NR primary synchronization signal (NR-PSS), an NR secondary synchronization signal (NR-SSS), and an NR Physical broadcast channel (NR-PBCH). The SS-burst 220 composes multiple SS-blocks 230 to enable repetitive transmissions of SS-blocks in different directions for multi-beam configurations. A SS-burst set includes multiple SS-bursts to complete the beam sweeping of a coverage area. For multi-beam configuration, SS-blocks may be transmitted from the same beam multiple times within one SS-burst. The number of SS-bursts within a SS-burst set and the number of SS-blocks within a SS-burst may be determined based on the deployment scenario and operating frequency band. For example, the number of SS-blocks within a SS-burst in the deployment scenario of beam sweeping in a multi-beam configuration may be determined by the number of beams and the downlink (DL)/guard period (GP)/uplink (UL) configuration. In order to complete beamsweeping the coverage area, each beam may have at least one SS-block transmission over the sweeping interval of the SS-burst. The number of SS-bursts within a SS-burst set and SS-blocks within a SS-burst may be flexibly determined in the deployment.

Figure 3:
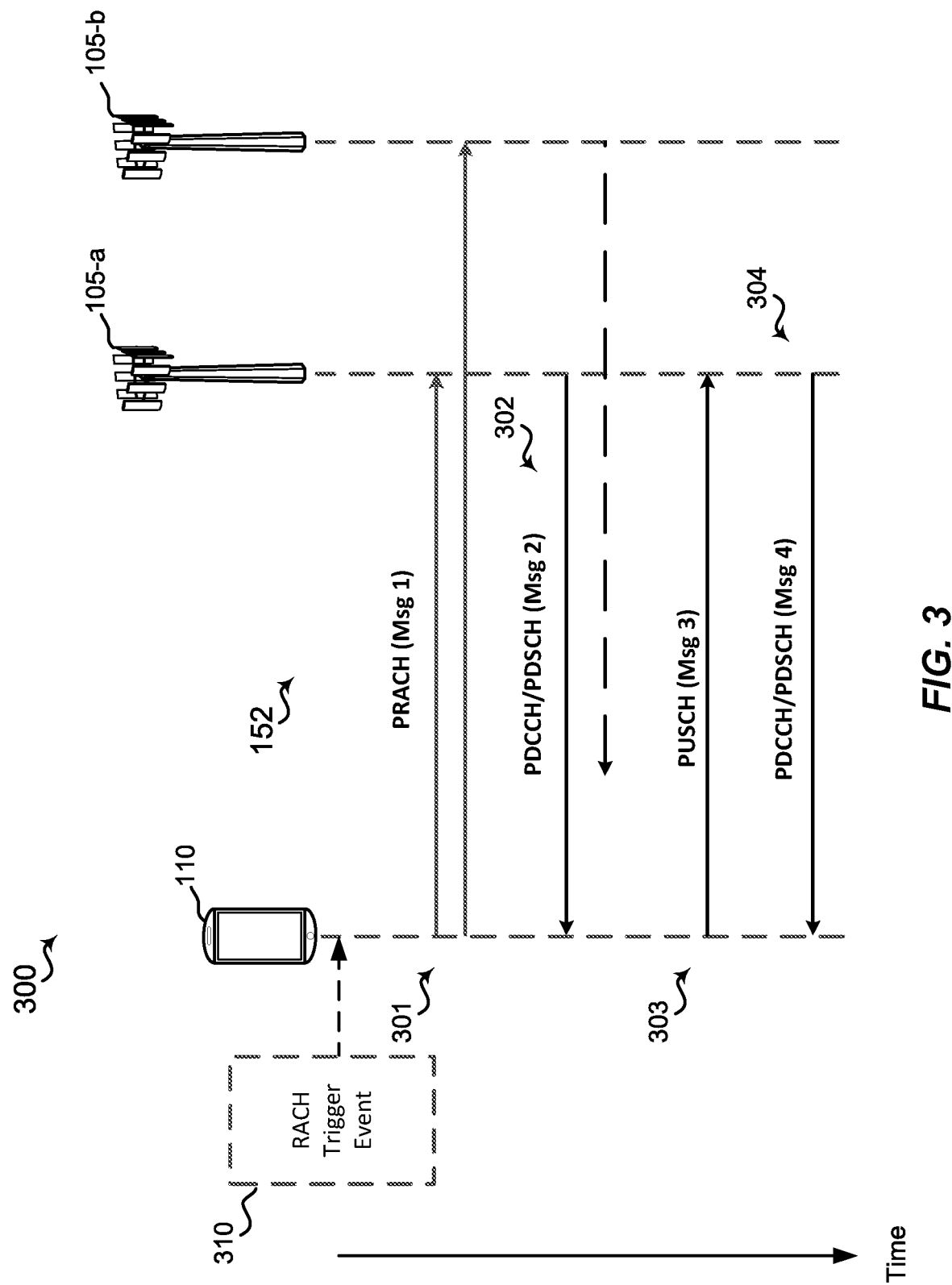
FIG. 3 is a message diagram of an example RACH procedure.

Referring additionally to FIG. 3 and Table 1 (below), during operation, UE 110 may execute an implementation of an NR RACH procedure, according to a 4-step NR RACH message flow 300, due to the occurrence of one or more RACH trigger events 310. Suitable examples of RACH trigger event 310 may include, but are not limited to: (i) an initial access from RRC_IDLE to RRC_CONNECTED ACTIVE; (ii) downlink (DL) data arrival during RRC_IDLE or RRC_CONNECTED INACTIVE; (iii) UL data arrival during RRC_IDLE or RRC_CONNECTED INACTIVE; (iv) a handover during the connected mode of operation; and (v) a connection re-establishment (e.g., a beam failure recovery procedure).

The NR RACH procedure may be associated with a contention based random access procedure, or with a contention free random access procedure. In an implementation, a contention based NR RACH procedure corresponds to the following RACH trigger events 310: an initial access from RRC_IDLE to RRC_CONNECTED ACTIVE; UL data arrival during RRC_IDLE or RRC_CONNECTED INACTIVE; and, a connection re-establishment. In an implementation, a contention-free NR RACH procedure corresponds to the following RACH trigger events 310: downlink (DL) data arrival during RRC_IDLE or RRC_CONNECTED INACTIVE; and, a handover during the connected mode of operation.

On the occurrence of any of the above RACH trigger events 310, the execution of NR RACH procedure may include 4-step NR RACH message flow 300 (see FIG. 3 and Table 1), where UE 110 exchanges messages with one or more base stations 105 to gain access to a wireless network and establish a communication connection.

TABLE 1

NR RACH procedure, including Messages and Message Content transmitted over corresponding Physical (PHY) channel(s).

| PHY Channel | Message | Message content |
|---|---|---|
| PRACH | Msg 1 | RACH Preamble |
| PDCCH/PDSCH | Msg 2 | Detected RACH preamble ID, TA, TC-RNTI, backoff indicator, UL/DL grants |
| PUSCH | Msg 3 | RRC Connection request (or scheduling request and tracking area update) |
| PDCCH/PDSCH | Msg 4 | Contention resolution message |

At 301, for example, UE 110 may transmit a first message (Msg 1), which may be referred to as a random access request message, to one or more base stations 105 via a physical channel, such as a physical random access channel (PRACH). For example, Msg 1 may include one or more of a RACH preamble and a resource requirement.

At 302, one of more of the base stations 105 may respond to Msg 1 by transmitting a second message (Msg 2), which may be referred to as a random access response (RAR) message, over a physical downlink control channel (e.g., PDCCH) and/or a physical downlink shared channel (e.g., PDSCH). For example, Msg 2 may include one or more of a detected preamble identifier (ID), a timing advance (TA) value, a temporary cell radio network temporary identifier (TC-RNTI), a backoff indicator, an UL grant, and a DL grant.

At 303, in response to receiving Msg 2, UE 110 may transmit a third message (Msg 3), which may be an RRC connection request or a scheduling request, via a physical uplink channel (e.g., PUSCH) based on the UL grant provided in Msg 2 of a selected serving base station 105-a. The UE 110 may ignore the Msg 2 of a non-selected base station 105-b. In an aspect, Msg 3 may include a tracking area update (TAU), such as on a periodic basis or if UE 110 moves outside of one or more tracking areas (TAs) initially provided to UE 110 in a tracking area identifier (TAI) list. Also, in some cases, Msg 3 may include a connection establishment cause indicator, which identifies a reason why UE 110 is requesting to connect to the network. In an aspect, Msg 3 may include an indication of a preferred SS-block 174. The UE 110 may execute the SSB index component 150 to transmit a compressed SSB index 158 in Msg 3 based on a number of actually transmitted beams indicated by the RMSI 176.

At 304, in response to receiving Msg 3, base station 105 may transmit a fourth message (Msg 4), which may be referred to as a contention resolution message, to UE 110 via a physical downlink control channel (e.g., PDCCH) and/or a physical downlink shared channel (e.g., PDSCH). For example, Msg 4 may include a cell radio network temporary identifier (C-RNTI) for UE 110 to use in subsequent communications.

In the above description, a collision scenario was not discussed but a collision between two or more UEs 110 requesting access can occur. For instance, two or more UEs 110 may send Msg 1 having a same RACH preamble, since the number of RACH preambles may be limited and may be randomly selected by each UE 110 in a contention-based NR RACH procedure. As such, each UE 110 will receive the same temporary C-RNTI and the same UL grant, and thus each UE 110 may send a similar Msg 3. In this case, base station 105-a may resolve the collision in one or more ways: (i) both Msg 3 may interfere with each other, and so base station 105-a may not send Msg 4, thus each UE 110 will retransmit Msg 1; (ii) base station 105-a may successfully decode only one Msg 3 and send an ACK message to that UE; and (iii) base station 105-a may successfully decode both Msg 3s, and then send a Msg 4 having a contention resolution identifier (e.g., an identifier tied to one of the UEs) to both UEs, and each UE 110 receives the Msg 4, decodes the Msg 4, and determines if the UE 110 is the correct UE by successfully matching or identifying the contention resolution identifier. It should be noted that such a problem may not occur in a contention-free NR RACH procedure, as in that case, base station 105-a may inform UE 110 of which RACH preamble to use.

The UE 110 may select physical random access channel (PRACH) resources for the Msg1 transmission based on the best received SS-block 174. The selection of the best SS-block 174 during Msg1 transmission allows the base station 105 to find the set of appropriate directions to transmit a channel state information reference signal (CSI-RS) for the UE 110. However, network 100 can also obtain the strongest SS-block index of the UE by configuring the UE 110 to convey this information explicitly through Msg3 of contention based random access and implicitly through Msg1 of contention free random access in dedicated time/frequency regions. Additionally, network 100 can configure UE 110 to report the strongest SS-block in Msg3 of contention based random access and Msg1 of contention free random access that occurs in dedicated time/frequency region. The network 100 may use this information to find appropriate CSI-RS directions for the UE 110.

A base station 105 may not transmit a maximum number of SS-blocks during an SS burst set. Since the UE 110 receives only a subset of the SS-blocks 174, the UE 110 may be unaware of which SS-blocks 174 were actually transmitted. The base station 105 may signal the actually transmitted SS-blocks in the remaining minimum system information (RMSI) 176. The RMSI 176 may carry a compressed indication of which SS-blocks 174 were transmitted. In an implementation, for example, the RMSI 176 may include a first bitmap indicating which groups of SS-blocks 174 are transmitted and a second bitmap indicating which SS-blocks 174 are actually transmitted within the group. A group may be defined as consecutive SS/PBCH blocks. Each group may have the same pattern of SS/PBSCH block transmission.

In an aspect, the number of bits used to convey the compressed SSB index 158 depends on a network configuration and a UE context or state. The configuration and state may determine the relevant SSBs among which one SSB is to be identified by an SSB index 154. Not all SSBs may be relevant; for example, some SSBs may not be transmitted or monitored. A parameter, M, may be defined as the number of relevant SSBs. The compressed SSB index 158 may be based on the parameter M. For example, the length of the compressed SSB index 158 may be the ceiling of $\log_2(M)$. That is, the length may be the minimum number of bits required to uniquely represent M SSBs. The compressed SSB index 158 may be mapped to the SSB index 154 when the relevant SSBs or indices thereof are known. Note that if M is not a power of 2, then certain possible values of the compressed SSB index of ceiling($\log_2(M)$) bits may be invalid. This may be avoided by enforcing M to be a power of 2, or by discarding messages with the index set to invalid values, or by assigning alternative interpretations to those invalid values. For example, an alternative interpretation may be to re-map the invalid values to a subset of the valid indices, but perform a different operation on the indices thus identified (e.g., a different type of measurement, etc.).

As mentioned above, the maximum number of SSBs, L, may depend on a frequency band used for communication. In an aspect, the number of relevant SSBs, M, may be the maximum number of SSBs, L. For example, in NR, L=4 for <=3 GHz, L=8 for 3-6 GHz, and L=64 for 6-52.6 GHz. By setting M=L, the compressed SSB index 158 may reduce the length of the index for frequency bands less than 6 GHz.

In another aspect, the UE state may be defined with respect to the RACH procedure (e.g., the NR RACH procedure described with respect to FIG. 3). Prior to the RACH procedure, the UE 110 has little information about the relevant SSBs. For example, the UE 110 may know only the frequency band being searched. Accordingly, the UE may initially set M=L. After the UE 110 acquires initial synchronization (by receiving an SSB) and reads RMSI 176, the UE 110 may have some information on which of the L SSBs are actually transmitted (e.g., based on the bit maps in the RMSI). Accordingly, the UE 110 may set M equal to the indicated number of SSBs transmitted during the RACH procedure. For example, if the UE 110 includes beam information such as identifying a preferred SSB in message 3 of the RACH procedure, the SSB index component 150 may transmit a compressed SSB index 158 with a length based on the indicated number of SSBs transmitted. Once the RACH procedure is completed and the UE 110 establishes an RRC connection with the base station 105, the UE 110 may receive updated or more detailed information on which of the L SSBs are actually transmitted. For example, an RRC configuration message may indicate exactly which SSBs are actually transmitted via a bitmap. Accordingly, the SSB index component 150 may set M equal to the number of transmitted SSBs indicated by the RRC configuration message, which may be different than the number of transmitted SSBs indicated by the RMSI 176.

In an aspect, the SSB index component 150 and the context component 152 may determine the number of relevant SSBs based on a combination of network configuration and UE state. A mapping rule 156 may determine how the SSB index component 150 maps between the SSB index 154 and the compressed SSB index 158. For example, for frequency bands with low L (e.g., frequency less than 6 GHz and L less than or equal to 8), the SSB index component 150 may set M=L, even if the base station 105 does not actually transmit the maximum number of L SSBs. Setting M=L may provide a simple reduction of index length (e.g., 6 bits reduced to 3 or 2 bits). Although further reductions based on actual number of SSBs transmitted may further reduce the index length, tracking the number of actually transmitted SSBs may also add complexity. In an aspect, however, if only one SSB is configured (e.g., M=1 when no beamsweeping), transmitting an SSB index 154 may not be necessary and the length of the compressed SSB index 158 may be zero. For cases where L is relatively large (e.g., L=64 for frequency bands greater than 6 GHz), setting M based on an indicated number of transmitted SSBs may provide significant reduction in the length of the compressed SSB index 158. For example, if a base station 105 is permitted to use L=64 SSBs, but only transmits 16 SSBs, the length of the compressed SSB index 158 may be reduced from 6 to 4. If the base station 105 further provides a UE with a specific set of SSBs to monitor (e.g., 4 SSBs), the compressed SSB index 158 may be reduced to 2.

The number of relevant SSBs and/or the length of the compressed SSB index 158 may also be based on a particular type of communication. For example, the UE 110 may report signal quality as either a layer 1 (PHY) RSRP report or a layer 3 (RRC) measurement report. A layer 1 RSRP may be transmitted on a control channel (e.g., PUCCH) with limited resources that is not protected by RLC retransmission or HARQ. Accordingly, a layer 1 RSRP transmission may benefit from a shorter compressed SSB index 158 that allows higher reliability. Therefore, M (or the index length) may be set based on the smallest number of relevant SSBs (e.g., a monitoring set). In contrast, a layer 3 measurement report may be transmitted on a higher capacity data channel protected by RLC and/or HARQ. Accordingly, the benefit of a shorter compressed SSB index 158 may be minimal and M may be set to L.

In another example, the UE 110 may transmit information regarding an SSB transmitted by a base station 105-b (e.g., a neighbor cell) other than a serving base station 105-a. For the serving base station 105-a, the UE 110 may have access to the RMSI 176 or RRC configuration messages and therefore know how many SS-blocks 174 are actually transmitted. When performing inter-cell measurements, the UE 110 may not have access to the RMSI 176 or RRC configuration messages associated with the other base station 105-*b*. Accordingly, when reporting inter-cell measurements, the SSB index component 150 may set M equal to L of the other base station 105-*b*, even if a lower value of M is used for measurement of the serving base station 105-*a*.

In an aspect, the UE 110 and the base station 105 may use the same mapping rule 156 to determine the length of the compressed SSB index 158 and the value corresponding to the respective SS-block 174. The UE 110 and the base station 105 may determine a current mapping rule 156 based on the same factors of network configuration and UE state. In another aspect, the base station 105 may provide a configuration parameter that indicates which mapping rule 156 to use. The base station 105 may transmit the configuration parameter via a management information block (MIB), system information block (SIB), RRC message, MAC control element (MAC-CE), or downlink control information (DCI).

In an aspect, the compressed SSB index 158 may be utilized in either uplink or downlink messages. The compressed SSB index 158 may replace a SSB-Index IE. For example, downlink messages may include signals identifying a set of one or more SSB indices to monitor or report, or identifying an index of a SSB that has a quasi-co-location (QCL) relationship to a signal of interest. Such messages may be carried in RRC signaling or in a MAC-CE, for example, a MAC-CE carrying an SP SRS activation or deactivation may indicate a QCL relationship between the SRS and an SSB. Example uplink messages may include a RACH message 3 or a 2-step RACH message-A that indicates a preferred SSB and layer 3 measurement reports indicating which SSB is measured.

Figure 4:
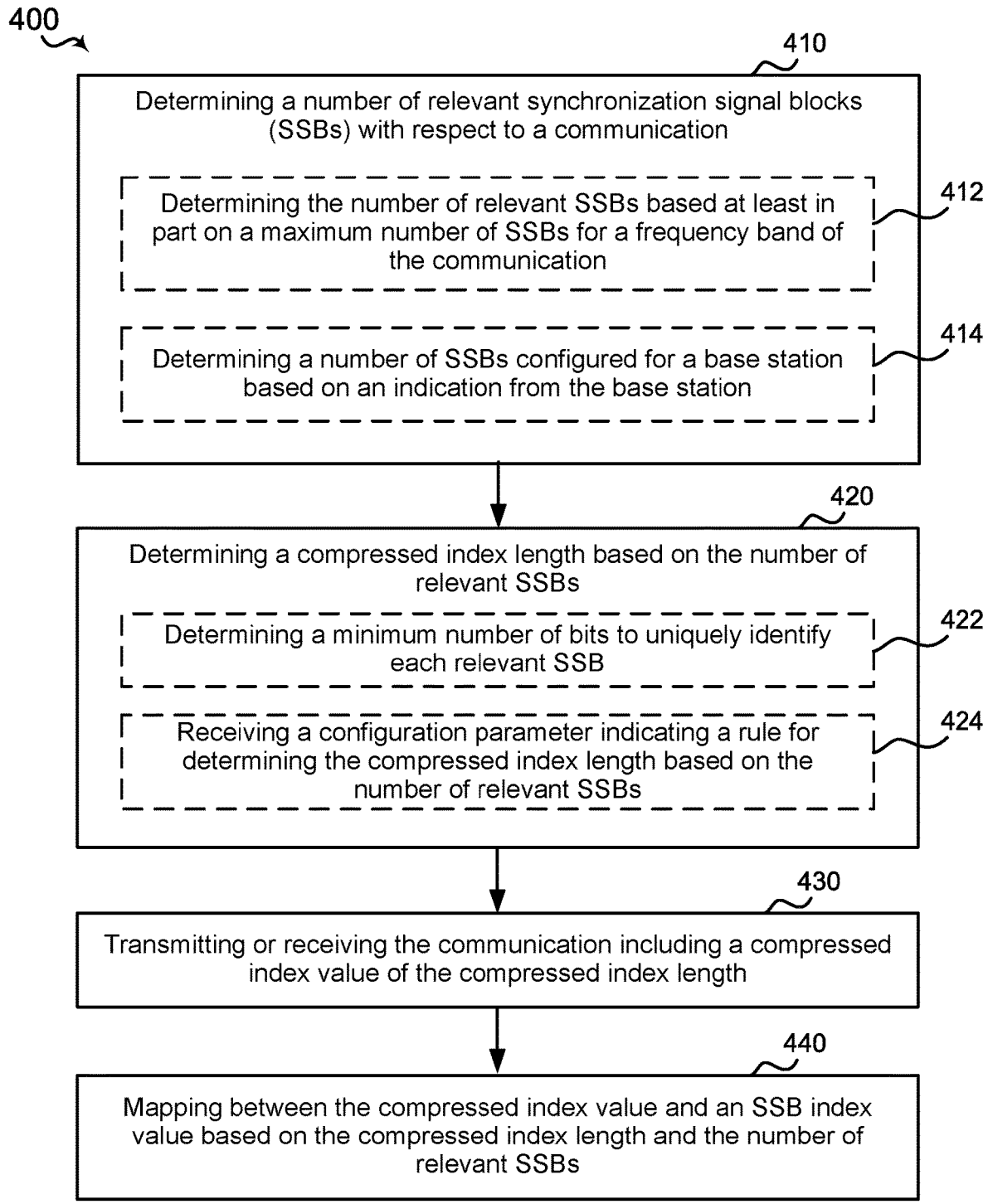
FIG. 4 is a flow diagram of an example method for communicating using a compressed SSB index.

Referring to FIG. 4, for example, a method 400 of wireless communication according to the above-described aspects for utilizing a compressed SSB index includes one or more of the below-defined actions. The method 400 may be performed by a UE 110 or a base station 105. The blocks of the method 400 may be performed in an order other than that illustrated and described. In particular, the block 430 may occur earlier (e.g., before block 440) when the UE 110 or the base station 105 is receiving a communication, and may occur later (e.g., after block 440) when the UE 110 or the base station 105 is transmitting a communication.

For example, at block 410, method 400 includes determining a number of relevant SSBs with respect to a communication. In an aspect, for example, the SSB index component 150 of UE 110 may execute the context component 152 or the base station 105 may execute the SSB component 170 to determine the number of relevant SS-blocks 174, M, with respect to a communication. The determination may be based on one or more of: a maximum number of SSBs for a frequency band of the communication, a state of a UE, or whether the SSBs are for a serving cell or neighbor cell In one aspect, at block 412, determining the number of relevant SSBs may include the context component 152 or the SSB component 170 determining the number of relevant SSBs based at least in part on a maximum number of SSBs for a frequency band of the communication. In another aspect (which may be performed by UE 110), at block 414, determining the number of relevant SSBs may include the context component 152 or the SSB component 170 determining a number of SSBs configured for a base station 105 based on an indication from the base station 105, such as the RMSI 176 or an RRC configuration message. In an aspect, the state of the UE may be defined with respect to the RACH procedure. For example, prior to the RACH procedure, the UE may be in an idle mode or an inactive mode, and after the RACH procedure, the UE may be in a connected mode. In another aspect, when reporting inter-cell measurements (e.g., of neighbor cells), the number of relevant SSBs may be maximum number of SSBs for a carrier frequency, whereas a lower number of relevant SSBs may be used for measurement of the serving cell (e.g., based on RMSI).

At block 420, method 400 may include determining a compressed index length based on the number of relevant SSBs. In an aspect, for example, the SSB index component 150 or the SSB component 170 may determine the compressed index length based on the number of relevant SSBs. For instance, at block 422, determining the compressed index length based on the number of relevant SSBs may include the SSB index component 150 or the SSB component 170 determining a minimum number of bits to uniquely identify each relevant SSB. In another aspect, at block 424, the determining the compressed index length based on the number of relevant SSBs may include the SSB index component 150 receiving a configuration parameter indicating a rule (e.g., mapping rule 156) for determining the compressed index length based on the number of relevant SSBs. The SSB index component 150 may determine the compressed index length based on the indicated rule.

At 430, method 400 may include transmitting or receiving the communication including a compressed index value of the compressed index length. In an aspect, for example, the SSB index component 150 or the SSB component 170 may transmit or receive the communication including a compressed index value (e.g., compressed SSB index 158) of the compressed index length. That is, the compressed SSB index 158 may include a number of bits equal to the determined compressed index length.

At 440, method 400 may include mapping between the compressed index value and an SSB index value based on the compressed index length and the number of relevant SSBs. In an aspect, for example, the SSB index component 150 or the SSB component 170 may map between the compressed index value (e.g., compressed SSB index 158) and an SSB index value (e.g., SSB index 154) based on the compressed index length and the number of relevant SSBs. For example, when receiving the communication, the SSB index component 150 or the SSB component 170 may convert the received value of the compressed SSB index 158 to a value of the SSB index 154. Conversely, when transmitting the communication, the SSB index component 150 or the SSB component 170 may convert the value of the SSB index 154 to the value of the compressed SSB index 158.

Although the above description is focused on SSB indexing, it may be noted that the concepts described herein apply more generally to indexing of any set of resources or signals, such as CSI-RS or SRS. For example, when multiple CSI-RS resources may be configured, the CSI-RS resource indexing may be based on the maximum possible number of CSI-RS resources, the actual number of configured CSI-RS resources, or the actual number of configured CSI-RS resources that are relevant to the operation (e.g., a measurement report) requiring identification of a CSI-RS resource by an index.

Figure 5:
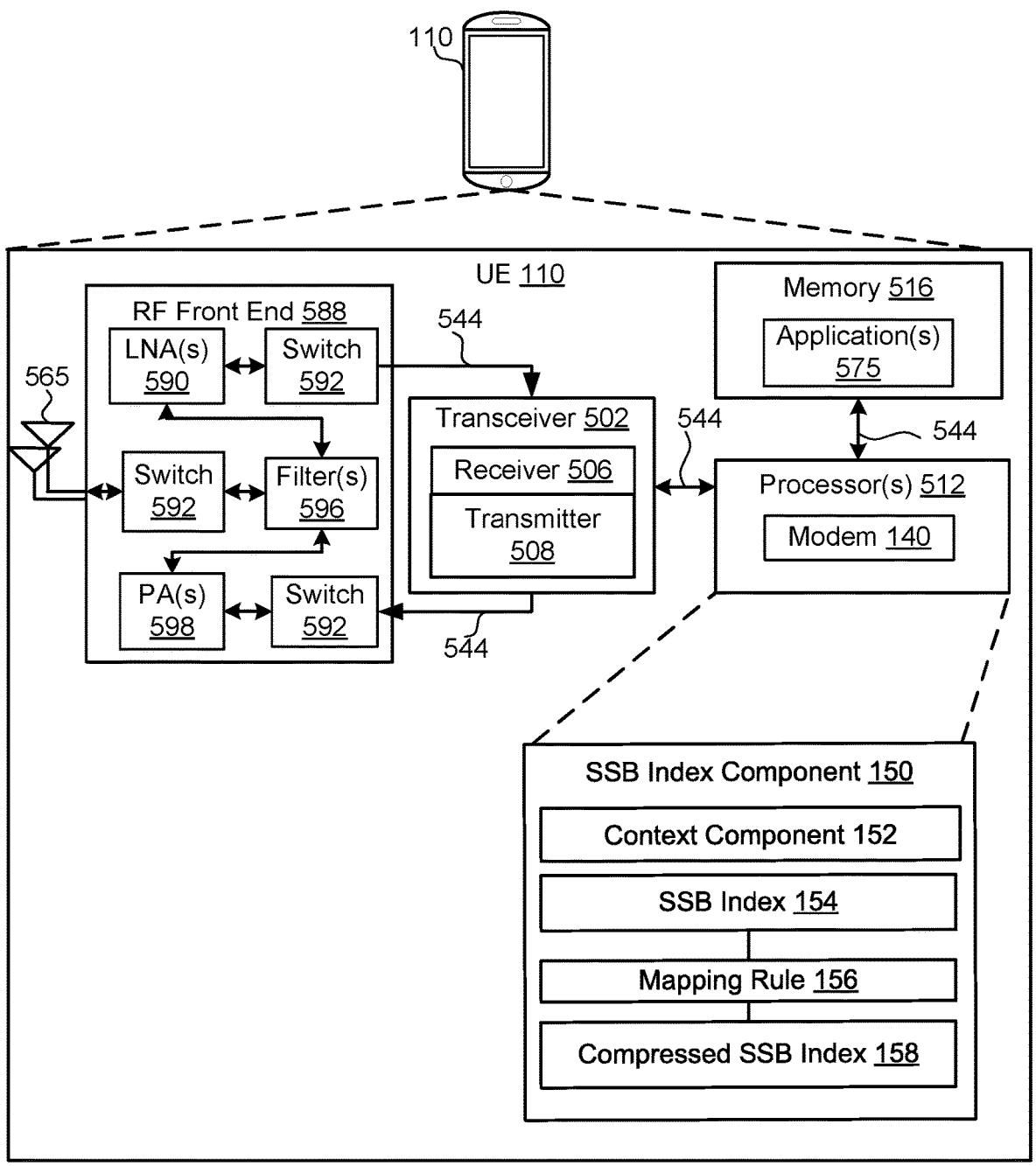
FIG. 5 is a schematic diagram of example components of the UE of FIG. 1.

Referring to FIG. 5, one example of an implementation of UE 110 may include a variety of components, some of which have already been described above, but including components such as one or more processors 512 and memory 516 and transceiver 502 in communication via one or more buses 544, which may operate in conjunction with modem 140 and SSB index component 150 to enable one or more of the functions described herein related to communicating using a compressed SSB index. Further, the one or more processors 512, modem 140, memory 516, transceiver 502, RF front end 588 and one or more antennas 565, may be configured to support voice and/or data calls (simultaneously or non-simultaneously) in one or more radio access technologies. The antennas 565 may include one or more antennas, antenna elements, and/or antenna arrays.

In an aspect, the one or more processors 512 can include a modem 140 that uses one or more modem processors. The various functions related to SSB index component 150 may be included in modem 140 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 140 associated with SSB index component 150 may be performed by transceiver 502.

Also, memory 516 may be configured to store data used herein and/or local versions of applications 575 or SSB index component 150 and/or one or more of the subcomponents thereof being executed by at least one processor 512. Memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, memory 516 may be a non-transitory computer-readable storage medium that stores one or more computer-executable codes defining SSB index component 150 and/or one or more of the subcomponents thereof, and/or data associated therewith, when UE 110 is operating at least one processor 512 to execute SSB index component 150 and/or one or more of the subcomponents thereof.

Transceiver 502 may include at least one receiver 506 and at least one transmitter 508. Receiver 506 may include hardware, firmware, and/or software code executable by a processor for receiving data, the code comprising instructions and being stored in a memory (e.g., computer-readable medium). Receiver 506 may be, for example, a radio frequency (RF) receiver. In an aspect, receiver 506 may receive signals transmitted by at least one base station 105. Additionally, receiver 506 may process such received signals, and also may obtain measurements of the signals, such as, but not limited to, Ec/Io, SNR, RSRP, RSSI, etc. Transmitter 508 may include hardware, firmware, and/or software code executable by a processor for transmitting data, the code comprising instructions and being stored in a memory (e.g., computer-readable medium). A suitable example of transmitter 508 may including, but is not limited to, an RF transmitter.

Moreover, in an aspect, UE 110 may include RF front end 588, which may operate in communication with one or more antennas 565 and transceiver 502 for receiving and transmitting radio transmissions, for example, wireless communications transmitted by at least one base station 105 or wireless transmissions transmitted by UE 110. RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals.

In an aspect, LNA 590 can amplify a received signal at a desired output level. In an aspect, each LNA 590 may have a specified minimum and maximum gain values. In an aspect, RF front end 588 may use one or more switches 592 to select a particular LNA 590 and a corresponding specified gain value based on a desired gain value for a particular application.

Further, for example, one or more PA(s) 598 may be used by RF front end 588 to amplify a signal for an RF output at a desired output power level. In an aspect, each PA 598 may have specified minimum and maximum gain values. In an aspect, RF front end 588 may use one or more switches 592 to select a particular PA 598 and a corresponding specified gain value based on a desired gain value for a particular application.

Also, for example, one or more filters 596 can be used by RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be connected to a specific LNA 590 and/or PA 598. In an aspect, RF front end 588 can use one or more switches 592 to select a transmit or receive path using a specified filter 596, LNA 590, and/or PA 598, based on a configuration as specified by transceiver 502 and/or processor 512.

As such, transceiver 502 may be configured to transmit and receive wireless signals through one or more antennas 565 via RF front end 588. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 502 to operate at a specified frequency and power level based on the UE configuration of the UE 110 and the communication protocol used by modem 140.

In an aspect, modem 140 can be a multiband-multimode modem, which can process digital data and communicate with transceiver 502 such that the digital data is sent and received using transceiver 502. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 588, transceiver 502) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 6:
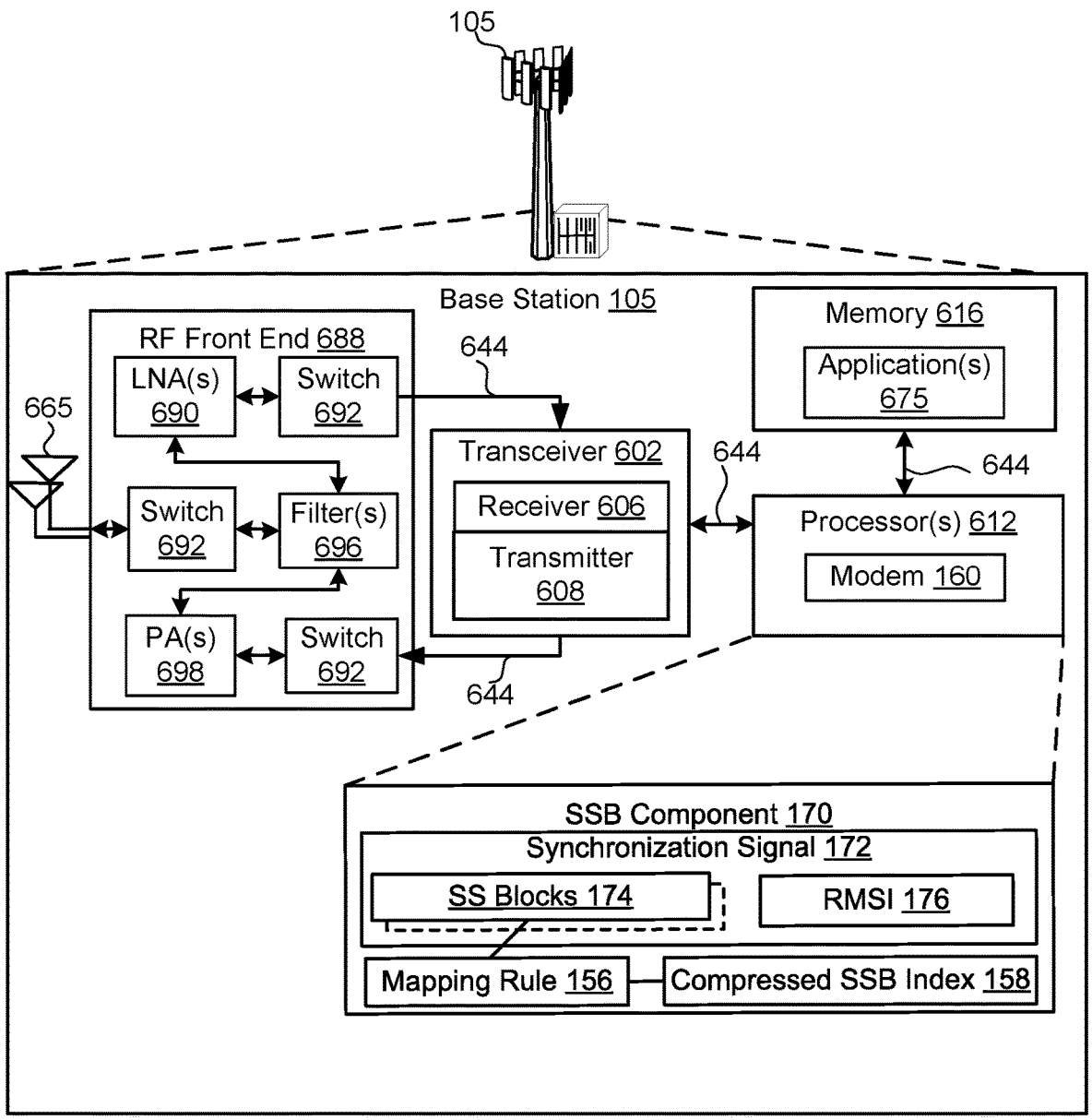
FIG. 6 is a schematic diagram of example components of the base station of FIG. 1.

Referring to FIG. 6, one example of an implementation of base station 105 may include a variety of components, some of which have already been described above, but including components such as one or more processors 612 and memory 616 and transceiver 602 in communication via one or more buses 644, which may operate in conjunction with modem 160 and SSB component 170 to enable one or more of the functions described herein related to utilizing a compressed SSB index.

The transceiver 602, receiver 606, transmitter 608, one or more processors 612, memory 616, applications 675, buses 644, RF front end 688, LNAs 690, switches 692, filters 696, PAs 698, and one or more antennas 665 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

SOME FURTHER EXAMPLE EMBODIMENTS

An example method of wireless communications for a UE, comprising: determining a number of relevant SSBs with respect to a communication based on one or more of: a maximum number of SSBs for a frequency band of the communication, a state of a UE, or whether the SSBs are for a serving cell or neighbor cell; determining a compressed index length based on the number of relevant SSBs; transmitting or receiving the communication including a compressed index value of the compressed index length; and mapping between the compressed index value and an SSB index value based on the compressed index length and the number of relevant SSBs.

The above example method, wherein determining the number of relevant SSBs comprises determining a subset of the maximum number of SSBs that are configured for a base station based on an indication from the base station.

One or more of the above example methods, wherein the indication is a remaining minimum system information (RMSI) transmitted by the base station.

One or more of the above example methods, wherein the number of relevant SSBs changes after the UE establishes a connection with a base station.

One or more of the above example methods, wherein determining the compressed index length based on the number of relevant SSBs comprises determining a minimum number of bits to uniquely identify each relevant SSB.

One or more of the above example methods, wherein determining the compressed index length based on the number of relevant SSBs comprises receiving a configuration parameter indicating a rule for determining the compressed index length based on the number of relevant SSBs and determining the compressed index length based on the indicated rule.

One or more of the above example methods, wherein the communication is a radio resource control layer measurement report associating a signal quality with the SSB index value.

One or more of the above example methods, wherein the communication is a configuration message indicating at least one SSB to be monitored.

One or more of the above example methods, wherein the communication is a random access channel message indicating a preferred SSB.

One or more of the above example methods, wherein the compressed index length is zero when a single SSB is configured.

A second example method of wireless communications for a base station, comprising: determining a number of relevant SSBs with respect to a communication; determining a compressed index length based on the number of relevant SSBs; receiving the communication including a compressed index value of the compressed index length; and mapping from the compressed index value to an SSB index value based on the compressed index length and the number of relevant SSBs.

A third example method of wireless communications for a base station, comprising: determining a number of relevant SSBs with respect to a communication; determining a compressed index length based on the number of relevant SSBs; mapping from a SSB index value to a compressed index value based on the compressed index length and the number of relevant SSBs; and transmitting the communication including the compressed index value of the compressed index length.

An example device (e.g., UE or base station) comprising a transceiver, a memory configured to store instructions, and one or more processors communicatively coupled with the transceiver and the memory, wherein the one or more processors are configured to perform all or part of one or more of the above example methods.

An example apparatus for use in a device (e.g., UE or base station) comprising means for wireless communication, means for storing instructions and data, and means for performing all or part of one or more of the above example methods.

A non-transitory computer-readable medium storing computer-executable code, the computer-readable medium comprising code to perform all or part of one or more of the above example methods.

An first example apparatus (e.g., UE or base station) comprising a transceiver, a memory configured to store instructions, and one or more processors communicatively coupled with the transceiver and the memory, wherein the one or more processors are configured to: determine a number of relevant SSBs with respect to a communication based on one or more of: a maximum number of SSBs for a frequency band of the communication, a state of a UE, or whether the SSBs are for a serving cell or neighbor cell; determine a compressed index length based on the number of relevant SSBs; transmit or receive the communication including a compressed index value of the compressed index length; and map between the compressed index value and an SSB index value based on the compressed index length and the number of relevant SSBs.

The above first example apparatus, wherein the processor is configured to determine that the number of relevant SSBs is a number of SSBs configured for a base station based on an indication from the base station.

One or more of the above example apparatuses, wherein the indication is a RMSI transmitted by the base station.

One or more of the above example apparatuses, wherein the number of relevant SSBs changes after a UE establishes a connection with a base station.

One or more of the above example apparatuses, wherein the processor is configured to determine a minimum number of bits to uniquely identify each relevant SSB and determine the compressed index length based on the minimum number of bits to uniquely identify each relevant SSB.

One or more of the above example apparatuses, wherein the processor is configured to receive a configuration parameter indicating a rule for determining the compressed index length based on the number of relevant SSBs and determine the compressed index length based on the indicated rule.

One or more of the above example apparatuses, wherein the communication is a radio resource control layer measurement report associating a signal quality with the SSB index value.

One or more of the above example apparatuses, wherein the communication is a configuration message indicating at least one SSB to be monitored.

One or more of the above example apparatuses, wherein the communication is a random access channel message indicating a preferred SSB.

One or more of the above example apparatuses, wherein the compressed index length is zero when a single SSB is configured.

A second example apparatus (e.g. UE or base station) for wireless communication, comprising: means for determining a number of relevant SSBs with respect to a communication based on one or more of: a maximum number of SSBs for a frequency band of the communication, a state of a UE, or whether the SSBs are for a serving cell or neighbor cell; means for determining a compressed index length based on the number of relevant SSBs; means for transmitting or receiving the communication including a compressed index value of the compressed index length; and means for mapping between the compressed index value and an SSB index value based on the compressed index length and the number of relevant SSBs.

The above second example apparatus, wherein the means for determining the number of relevant SSBs is configured to determine a subset of the maximum number of SSBs that are configured for a base station based on an indication from the base station.

One or more of the above second example apparatuses, wherein the indication is a RMSI transmitted by the base station.

One or more of the above second example apparatuses, wherein the number of relevant SSBs changes after a UE establishes a connection with a base station.

One or more of the above second example apparatuses, wherein the means for determining a compressed index length is configured to determine a minimum number of bits to uniquely identify each relevant SSB and determine the compressed index length based on the minimum number of bits to uniquely identify each relevant SSB.

One or more of the above second example apparatuses, wherein the means for determining a compressed index length is configured to receive a configuration parameter indicating a rule for determining the compressed index length based on the number of relevant SSBs and determine the compressed index length based on the indicated rule.

One or more of the above second example apparatuses, wherein the communication is a radio resource control layer measurement report associating a signal quality with the SSB index value.

One or more of the above second example apparatuses, wherein the communication is a configuration message indicating at least one SSB to be monitored.

One or more of the above second example apparatuses, wherein the communication is a random access channel message indicating a preferred SSB.

An example non-transitory computer-readable medium storing computer-executable code, the computer-readable medium comprising code to: determine a number of relevant synchronization signal blocks (SSBs) with respect to a communication based at least on a maximum number of SSBs for a frequency band of the communication; determine a compressed index length based on the number of relevant SSBs; transmit or receiving receive the communication including a compressed index value of the compressed index length; and map between the compressed index value and an SSB index value based on the compressed index length and the number of relevant SSBs.

The above first example non-transitory computer-readable medium, wherein the code to determine the number of relevant SSBs comprises code to determine that the number of relevant SSBs is a number of SSBs configured for a base station based on an indication from the base station.

One or more of the above example non-transitory computer-readable media, wherein the indication is a RMSI transmitted by the base station.

One or more of the above example non-transitory computer-readable media, wherein the number of relevant SSBs changes after a UE establishes a connection with a base station.

One or more of the above example non-transitory computer-readable media, wherein the code to determine the compressed index length comprises code to determine a minimum number of bits to uniquely identify each relevant SSB and determine the compressed index length based on the minimum number of bits to uniquely identify each relevant SSB.

One or more of the above example non-transitory computer-readable media, wherein the code to determine the compressed index length comprises code to receive a configuration parameter indicating a rule for determining the compressed index length based on the number of relevant SSBs and determine the compressed index length based on the indicated rule.

One or more of the above example non-transitory computer-readable media, wherein the communication is a radio resource control layer measurement report associating a signal quality with the SSB index value.

One or more of the above example non-transitory computer-readable media, wherein the communication is a configuration message indicating at least one SSB to be monitored.

One or more of the above example non-transitory computer-readable media, wherein the communication is a random access channel message indicating a preferred SSB.

One or more of the above example non-transitory computer-readable media, wherein the compressed index length is zero when a single SSB is configured.

What is claimed is:

1. A method of wireless communications, comprising:
   determining a number of relevant synchronization signal blocks (SSBs) with respect to a communication based on one or more of: a maximum number of SSBs for a frequency band of the communication, a state of a user equipment (UE), or whether the SSBs are for a serving cell or neighbor cell;
   determining a compressed index length based on the number of relevant SSBs;
   transmitting or receiving the communication including a compressed index value indicating a single SSB, the compressed index value having the compressed index length; and
   mapping between the compressed index value and an SSB index value for the single SSB based on the compressed index length and the number of relevant SSBs, wherein determining the number of relevant SSBs comprises determining a subset of the maximum number of SSBs that are configured for a base station based on an indication from the base station, and the compressed index length is zero when a single SSB is configured.

2. The method of claim 1, wherein the indication is a remaining minimum system information (RMSI) transmitted by the base station.

3. The method of claim 1, wherein the number of relevant SSBs changes after the UE establishes a connection with a base station.

4. The method of claim 1, wherein determining the compressed index length based on the number of relevant SSBs comprises determining a minimum number of bits to uniquely identify each relevant SSB.

5. The method of claim 1, wherein determining the compressed index length based on the number of relevant SSBs comprises receiving a configuration parameter indicating a rule for determining the compressed index length based on the number of relevant SSBs and determining the compressed index length based on the indicated rule.

6. A method of wireless communications, comprising:
   determining a number of relevant synchronization signal blocks (SSBs) with respect to a communication based on one or more of: a maximum number of SSBs for a frequency band of the communication, a state of a user equipment (UE), or whether the SSBs are for a serving cell or neighbor cell;
   determining a compressed index length based on the number of relevant SSBs;
   transmitting or receiving the communication including a compressed index value indicating a single SSB, the compressed index value having the compressed index length; and
   mapping between the compressed index value and an SSB index value for the single SSB based on the compressed index length and the number of relevant SSBs, wherein the communication comprises a radio resource control layer measurement report associating a signal quality with the SSB index value.

7. The method of claim 1, wherein the communication is a configuration message indicating at least one SSB to be monitored.

8. A method of wireless communications, comprising:
   determining a number of relevant synchronization signal blocks (SSBs) with respect to a communication based on one or more of: a maximum number of SSBs for a frequency band of the communication, a state of a user equipment (UE), or whether the SSBs are for a serving cell or neighbor cell;

determining a compressed index length based on the number of relevant SSBs;

transmitting or receiving the communication including a compressed index value indicating a single SSB, the compressed index value having the compressed index length; and mapping between the compressed index value and an SSB index value for the single SSB based on the compressed index length and the number of relevant SSBs, wherein the communication comprises a random access channel message indicating a preferred SSB.

9. An apparatus for wireless communication, comprising:
a memory;
a wireless transceiver; and
a processor communicatively coupled with the memory and the wireless transceiver, the processor configured to:
determine a number of relevant synchronization signal blocks (SSBs) with respect to a communication based on one or more of: a maximum number of SSBs for a frequency band of the communication, a state of a user equipment (UE), or whether the SSBs are for a serving cell or neighbor cell;
determine a compressed index length based on the number of relevant SSBs;
transmit or receive the communication including a compressed index value indicating a single SSB, the compressed index value having the compressed index length; and
map between the compressed index value and an SSB index value for the single SSB based on the compressed index length and the number of relevant SSBs wherein the processor is configured to determine that the number of relevant SSBs is a number of SSBs configured for a base station based on an indication from the base station, and the compressed index length is zero when a single SSB is configured.

10. The apparatus of claim 9, wherein the indication is a remaining minimum system information (RMSI) transmitted by the base station.

11. The apparatus of claim 9, wherein the number of relevant SSBs changes after the UE establishes a connection with a base station.

12. The apparatus of claim 9, wherein the processor is configured to determine a minimum number of bits to uniquely identify each relevant SSB and determine the compressed index length based on the minimum number of bits to uniquely identify each relevant SSB.

13. The apparatus of claim 9, wherein the processor is configured to receive a configuration parameter indicating a rule for determining the compressed index length based on the number of relevant SSBs and determine the compressed index length based on the indicated rule.

14. An apparatus for wireless communication, comprising:
a memory;
a wireless transceiver; and
a processor communicatively coupled with the memory and the wireless transceiver, the processor configured to:
determine a number of relevant synchronization signal blocks (SSBs) with respect to a communication based on one or more of: a maximum number of SSBs for a frequency band of the communication, a state of a user equipment (UE), or whether the SSBs are for a serving cell or neighbor cell;

determine a compressed index length based on the number of relevant SSBs;
transmit or receive the communication including a compressed index value indicating a single SSB, the compressed index value having the compressed index length; and
map between the compressed index value and an SSB index value for the single SSB based on the compressed index length and the number of relevant SSBs, wherein the communication comprises a radio resource control layer measurement report associating a signal quality with the SSB index value.

15. The apparatus of claim 9, wherein the communication is a configuration message indicating at least one SSB to be monitored.

16. An apparatus for wireless communication, comprising:
a memory;
a wireless transceiver; and
a processor communicatively coupled with the memory and the wireless transceiver, the processor configured to:
determine a number of relevant synchronization signal blocks (SSBs) with respect to a communication based on one or more of: a maximum number of SSBs for a frequency band of the communication, a state of a user equipment (UE), or whether the SSBs are for a serving cell or neighbor cell;
determine a compressed index length based on the number of relevant SSBs;
transmit or receive the communication including a compressed index value indicating a single SSB, the compressed index value having the compressed index length; and
map between the compressed index value and an SSB index value for the single SSB based on the compressed index length and the number of relevant SSBs, wherein the communication comprises a random access channel message indicating a preferred SSB.

17. An apparatus for wireless communication, comprising:
means for determining a number of relevant synchronization signal blocks (SSBs) with respect to a communication based on one or more of: a maximum number of SSBs for a frequency band of the communication, a state of a user equipment (UE), or whether the SSBs are for a serving cell or neighbor cell;
means for determining a compressed index length based on the number of relevant SSBs;
means for transmitting or receiving the communication including a compressed index value indicating a single SSB, the compressed index value having the compressed index length; and
means for mapping between the compressed index value and an SSB index value for the single SSB based on the compressed index length and the number of relevant SSBs, wherein the means for determining the number of relevant SSBs is configured to determine a subset of the maximum number of SSBs that are configured for a base station based on an indication from the base station, and the compressed index length is zero when a single SSB is configured.

18. The apparatus of claim 17, wherein the indication is a remaining minimum system information (RMSI) transmitted by the base station.

19. The apparatus of claim 17, wherein the number of relevant SSBs changes after the UE establishes a connection with a base station.

20. The apparatus of claim 17, wherein the means for determining the compressed index length is configured to determine a minimum number of bits to uniquely identify each relevant SSB and determine the compressed index length based on the minimum number of bits to uniquely identify each relevant SSB.

21. The apparatus of claim 17, wherein the means for determining the compressed index length is configured to receive a configuration parameter indicating a rule for determining the compressed index length based on the number of relevant SSBs and determine the compressed index length based on the indicated rule.

22. An apparatus for wireless communication, comprising:
means for determining a number of relevant synchronization signal blocks (SSBs) with respect to a communication based on one or more of: a maximum number of SSBs for a frequency band of the communication, a state of a user equipment (UE), or whether the SSBs are for a serving cell or neighbor cell;
means for determining a compressed index length based on the number of relevant SSBs;
means for transmitting or receiving the communication including a compressed index value indicating a single SSB, the compressed index value having the compressed index length; and
means for mapping between the compressed index value and an SSB index value for the single SSB based on the compressed index length and the number of relevant SSBs, wherein the communication comprises a radio resource control layer measurement report associating a signal quality with the SSB index value.

23. The apparatus of claim 17, wherein the communication is a configuration message indicating at least one SSB to be monitored.

24. An apparatus for wireless communication, comprising:
means for determining a number of relevant synchronization signal blocks (SSBs) with respect to a communication based on one or more of: a maximum number of SSBs for a frequency band of the communication, a state of a user equipment (UE), or whether the SSBs are for a serving cell or neighbor cell;
means for determining a compressed index length based on the number of relevant SSBs;
means for transmitting or receiving the communication including a compressed index value indicating a single SSB, the compressed index value having the compressed index length; and
means for mapping between the compressed index value and an SSB index value for the single SSB based on the compressed index length and the number of relevant SSBs, wherein the communication comprises a random access channel message indicating a preferred SSB.

25. A non-transitory computer-readable medium storing computer-executable code, the computer-readable medium comprising code to:
determine a number of relevant synchronization signal blocks (SSBs) with respect to a communication based on one or more of: a maximum number of SSBs for a frequency band of the communication, a state of a user equipment (UE), or whether the SSBs are for a serving cell or neighbor cell;
determine a compressed index length based on the number of relevant SSBs;
transmit or receive the communication including a compressed index value indicating a single SSB, the compressed index value having the compressed index length; and
map between the compressed index value and an SSB index value for the single SSB based on the compressed index length and the number of relevant SSBs, wherein the number of relevant SSBs is determined based on a subset of the maximum number of SSBs that are configured for a base station in accord with an indication from the base station, and the compressed index length is zero when a single SSB is configured.

26. The method of claim 6, wherein the number of relevant SSBs changes after the UE establishes a connection with a base station.

27. The method of claim 6, wherein determining the compressed index length based on the number of relevant SSBs comprises determining a minimum number of bits to uniquely identify each relevant SSB.

28. The method of claim 6, wherein determining the compressed index length based on the number of relevant SSBs comprises receiving a configuration parameter indicating a rule for determining the compressed index length based on the number of relevant SSBs and determining the compressed index length based on the indicated rule.

29. The method of claim 6, wherein the communication is a configuration message indicating at least one SSB to be monitored.

30. The method of claim 8, wherein the number of relevant SSBs changes after the UE establishes a connection with a base station.

31. The method of claim 8, wherein determining the compressed index length based on the number of relevant SSBs comprises determining a minimum number of bits to uniquely identify each relevant SSB.

32. The method of claim 8, wherein determining the compressed index length based on the number of relevant SSBs comprises receiving a configuration parameter indicating a rule for determining the compressed index length based on the number of relevant SSBs and determining the compressed index length based on the indicated rule.

33. The method of claim 8, wherein the communication is a configuration message indicating at least one SSB to be monitored.

34. The apparatus of claim 22, wherein the number of relevant SSBs changes after the UE establishes a connection with a base station.

35. The apparatus of claim 22, wherein the means for determining the compressed index length is configured to determine a minimum number of bits to uniquely identify each relevant SSB and determine the compressed index length based on the minimum number of bits to uniquely identify each relevant SSB.

36. The apparatus of claim 22, wherein the means for determining the compressed index length is configured to receive a configuration parameter indicating a rule for determining the compressed index length based on the number of relevant SSBs and determine the compressed index length based on the indicated rule.

37. The apparatus of claim 22, wherein the communication is a configuration message indicating at least one SSB to be monitored.

38. The apparatus of claim 24, wherein the number of relevant SSBs changes after the UE establishes a connection with a base station.

39. The apparatus of claim 24, wherein the means for determining the compressed index length is configured to determine a minimum number of bits to uniquely identify each relevant SSB and determine the compressed index length based on the minimum number of bits to uniquely identify each relevant SSB.

40. The apparatus of claim 24, wherein the means for determining the compressed index length is configured to receive a configuration parameter indicating a rule for determining the compressed index length based on the number of relevant SSBs and determine the compressed index length based on the indicated rule.

41. The apparatus of claim 24, wherein the communication is a configuration message indicating at least one SSB to be monitored.

* * * * *